(12) United States Patent
Reime et al.

(10) Patent No.: US 6,927,384 B2
(45) Date of Patent: Aug. 9, 2005

(54) METHOD AND DEVICE FOR DETECTING TOUCH PAD UNIT

(75) Inventors: Gerd Reime, Schomberg (DE); Terho Kaikuranta, Piispanristi (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/928,967

(22) Filed: Aug. 13, 2001

(65) Prior Publication Data

US 2003/0034439 A1 Feb. 20, 2003

(51) Int. Cl.⁷ .................................................. G06M 7/00
(52) U.S. Cl. ...................................... 250/221; 345/175
(58) Field of Search ................................ 250/221, 549; 341/31; 345/168, 170, 173, 175, 179, 180, 176; 178/18.03, 18.09, 18.11

(56) References Cited

U.S. PATENT DOCUMENTS

| | | | | |
|---|---|---|---|---|
| 3,673,327 A | * | 6/1972 | Johnson et al. | 178/18.04 |
| 4,301,447 A | | 11/1981 | Funk et al. | 340/365 |
| 4,311,990 A | * | 1/1982 | Burke | 250/221 |
| 4,459,476 A | * | 7/1984 | Weissmueller et al. | 250/221 |
| 4,710,759 A | * | 12/1987 | Fitzgibbon | 345/175 |
| 4,893,120 A | | 1/1990 | Doering et al. | 341/31 |
| 5,666,037 A | | 9/1997 | Reime | 318/483 |
| 5,707,160 A | | 1/1998 | Bowen | 400/472 |
| 5,726,685 A | * | 3/1998 | Kuth et al. | 345/173 |
| 6,337,918 B1 | * | 1/2002 | Holehan | 382/124 |
| 2002/0075243 A1 | | 6/2002 | Newton | 345/173 |

FOREIGN PATENT DOCUMENTS

| | | | | |
|---|---|---|---|---|
| EP | 0706648 | 1/1995 | | G01N/21/43 |
| WO | WO 01/69582 | 9/2001 | | |

* cited by examiner

*Primary Examiner*—Thanh X. Luu
(74) *Attorney, Agent, or Firm*—Ware, Fressola, Van Der Sluys & Adolphson LLP

(57) ABSTRACT

A method and system for detecting the presence of an object at a touch pad device, wherein the touch pad device has a designated interaction area for allowing a user to use the object to interact with the touch pad device for inputting one or more functions in an electronic device. One or more groups of optical sensor components, each including an optical receiver and two light emitters positioned at opposite sides of the receiver such that when an object is present at the touch pad device, the changes in the receiver output can be used to determine the location of the object as a function of time. Preferably, the light emitters are operated in a pulsed mode so that the changes in the receiver output contain a frequency component so as to distinguish the changes due to the presence of the object and those of ambient light.

25 Claims, 16 Drawing Sheets

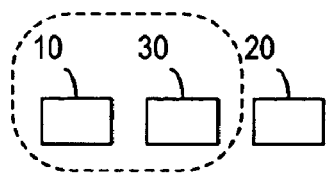
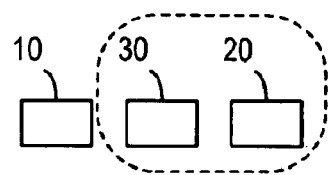
FIG. 3A    FIG. 3B
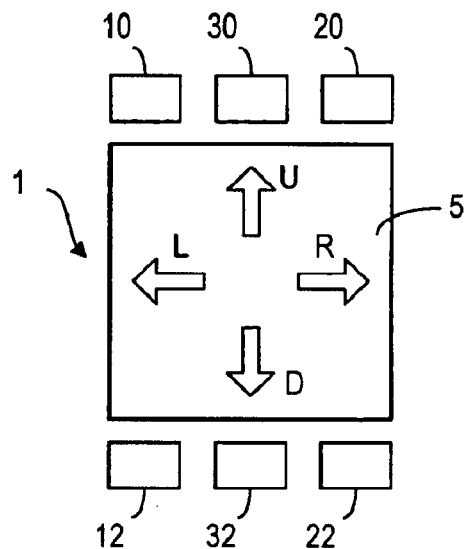
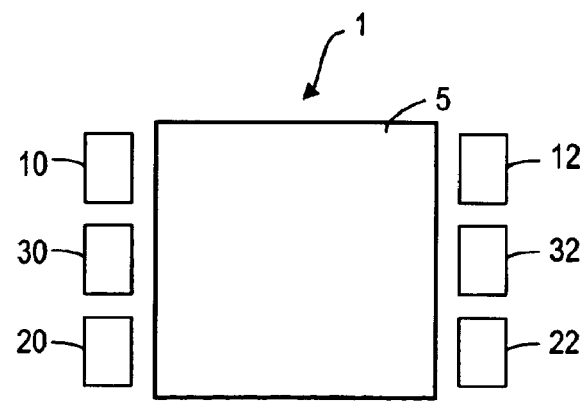
FIG. 4A    FIG. 4B

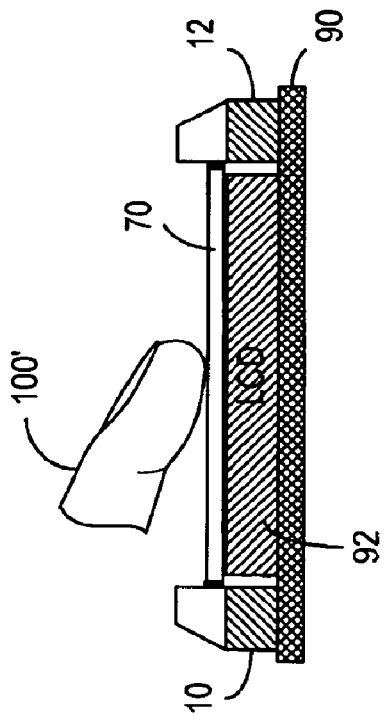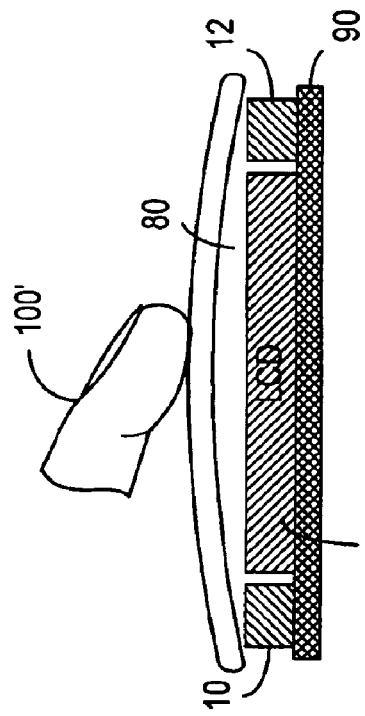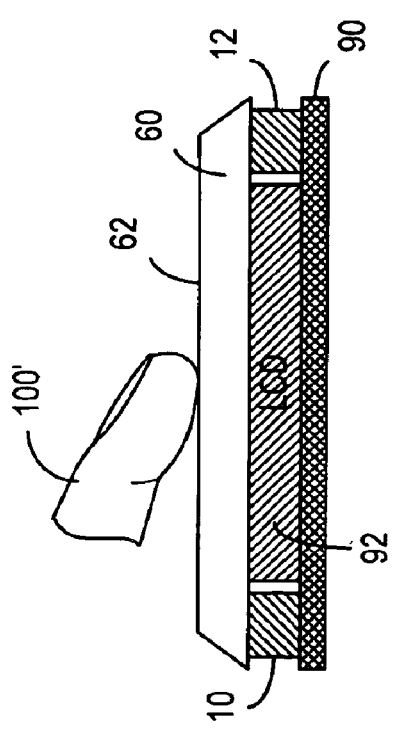

METHOD AND DEVICE FOR DETECTING TOUCH PAD UNIT

CROSS REFERENCE TO RELATED APPLICATIONS

Reference is made to pending application Ser. No. 09/928,929 entitled METHOD AND SYSTEM FOR PREVENTING UNINTENDED TOUCH PAD INPUT DUE TO ACCIDENTAL TOUCHING, assigned to the assignee of the present invention and filed on even date herewith.

FIELD OF THE INVENTION

The present invention relates generally to a touch sensitive device in an electronic device or a wireless telecommunication terminal.

BACKGROUND OF THE INVENTION

A touch pad is usually defined as a touch-sensitive user interface area in an electronic device, which allows a user to input information or a command to the device by pressing the touch sensitive area. The touch pad can be used as a keypad having a designated functionality. For example, a touch pad can be used as an on/off switch and the user can turn the electronic device on or off by pressing the touch sensitive area. The touch pad can have several selectable functions. For example, the touch pad can be used as a keyboard having a plurality of soft-keys of different functions to allow the user to enter or select one function at a time.

In some touch pads, it is required to press the pad surface in order to deform it. In such a touch pad, several layers of material, separated by thin spacers, are used to form a grid of vertical and horizontal rows of electrodes. An electrical current is maintained in the grid of electrodes. When a user presses the pad, the layers are caused to make contact with each other at the pressing point, thereby interrupting the current in the electrode grid. A detection circuit is used to detect the interruption in the current and determine the location of the pressing point on the pad. In other touch pads, mere touching of the pad surface by a finger is sufficient. This latter type of touch pad can be of a resistive-type or capacitive-type. On a resistive-type touch pad, a thin, electrically conductive and resistive layer is coated on the surface of the touch pad area. On a capacitive-type touch pad, a coated layer forming a matrix of pixel-like capacitors is provided on the touch sensitive area. When a finger touches the surface, it changes the electrical characteristics of the coated layer. By measuring the resistance or capacitance values at a number of surface points corresponding to the pressing point, the location of the pressing point can be determined. On an inductive-type touch pad, inductive elements are distributed over the touch pad area. A stylus made of an inductive material is used to change the signals transmitted through the inductive elements for the detection of the presence of the stylus. In some touch pads, if the user moves the touching object around the touch sensitive area and a series of pressing points are registered, the movement of the touching object can also be calculated.

When the touch pad is also used as an information display or an image display, the electrodes positioned on top of a touch pad may affect the optical transparency of display and/or distort the displayed text or image. Furthermore, some touch pads can be damaged by having dirt or scratches on the touch pad surface. In recent years, surface wave technology is also used in touch pad applications. In particular, ultrasonic waves propagating on the touch pad surface are used to detect the interruption or absorption of the waves due to touching. While a touch pad using this surface wave technology does not affect the optical quality of the display, it is costly to produce.

It is advantageous and desirable to provide a touch pad, which is cost effective and does not affect its optical quality.

SUMMARY OF THE INVENTION

According to the first aspect of the present invention, a method of sensing and detecting the presence of an object at a touch pad device having one or more input functions, wherein the touch pad device has a designated interaction area for allowing a user to use the object to interact with the touch pad device to facilitate the input of touch pad functions, said method comprising the steps of:

providing at least one group of optical sensor components including a first light emitter, a second light emitter and a light receiver in the touch pad device at different locations thereof such that the receiver is capable of receiving a first amount of light emitted by the first light emitter and a second amount of light emitted by the second light emitter; wherein when the object is present at the touch pad device, causes a change in the first amount of light and the second amount of light;

measuring separately the change in the first amount of light and the change in the second amount of light for providing a first signal and a second signal indicative of the respective changes; and determining the location of the object in the designated interaction area in relation to the first light emitter and the second light emitter based on the first and second signals.

It is preferable that the first and second emitters are operated in a pulsed mode of a predetermined frequency so that the changes in the first amount of light and second amount of light contain a frequency component so as to distinguish the changes in the first amount of light and second amount of light due to the presence of the object over the changes due to ambient light.

It is further preferable to provide a compensation emitter, which is placed adjacent to the receiver and operated in a pulsed mode of the same frequency, but with a complementary phase regarding the first and second emitters, so as to reduce the effect of the surface condition of the touch pad device on the changes in the first amount of light and second amount of light.

It is also preferable to provide a second group of similar optical sensor components in the touch pad device placed at different locations for further determining the location of the object in the designated interaction area in relation to light emitters in the second group of optical sensor components. The optical sensor components can be placed within the designated interaction area or outside the designated interaction area.

According to the second aspect of the present invention, a touch pad device to be used in conjunction with a measurement device, the touch pad device having a designated interaction area for sensing and detecting the presence of an object at the designated interaction area, said touch pad device comprising:

a light receiver provided in or near the designated interaction area, and a first light emitter and a second light emitter provided respectively at a first location and a second different location in the designated interaction such that the receiver is capable of receiving a first amount of light emitted by the first light emitter and a second amount of light emitted by the second light emitter, wherein when the object is present at the touch pad device, causes a change in the first amount of light and the second amount of light, the change in the first amount of light and the change in the second amount of light being separately measured by the measurement device for determining the location of the object in the designated interaction area in relation to the first light emitter and the second light emitter based on the first and second signals.

It is preferable that the first and second emitters are operated in a pulsed mode of a predetermined frequency so that the changes in the first amount of light and second amount of light contain a frequency component so as to distinguish the changes in the first amount of light and second amount of light due to the presence of the object over the changes due to ambient light.

It is further preferable to provide a compensation emitter, which is placed adjacent to the receiver and operated in a pulsed mode of the same frequency, but with a complementary phase regarding the first and second emitter, so as to reduce the effect of the surface condition of the touch pad device on the changes in the first amount of light and second amount of light.

It is also preferable that the touch pad device further comprises a second group of similar optical sensor components placed in or near the designated interaction area at different locations from the locations of the first and second light emitters and the receiver for further determining the location of the object in the designated interaction area in relation to light emitters in the second group of optical sensor components. The optical sensor components can be placed inside the designated interaction area or outside the designated interaction area.

According to the third aspect of the present invention, a system for sensing and detecting the presence of an object at a touch pad device, wherein the touch pad device has a designated interaction area for allowing a user to use the object to interact with the touch pad device, said system comprising:

at least one group of optical sensor components including a first light emitter, a second light emitter and a light receiver in the touch pad device at different locations thereof such that the receiver is capable of receiving a first amount of light emitted by the first light emitter and a second amount of light emitted by the second light emitter, wherein the first amount of light and the second amount of light are caused to change when the object is present at the touch pad device;

means, operatively connected to the light receiver, for separately measuring the change in the first amount of light and the change in the second amount of light for providing a first signal and a second signal indicative of the respective changes; and means, responsive to the first signal and second signal, for determining the location of the object in the designated interaction area in relation to the first light emitter and the second light emitter based on the first and second signals.

It is preferable that the first and second emitters are operated in a pulsed mode of a predetermined frequency so that the changes in the first amount of light and second amount of light contain a frequency component so as to distinguish the changes in the first amount of light and second amount of light due to the presence of the object over the changes due to ambient light.

It is further preferable to provide a compensation emitter, which is placed adjacent to the receiver and operated in a pulsed mode of the same frequency, but with a complementary phase regarding the first and second emitter, so as to reduce the effect of the surface condition of the touch pad device on the changes in the first amount of light and second amount of light.

It is also preferable to provide a second group of similar optical sensor components in the touch pad device placed at different locations for further determining the location of the object in the designated interaction area in relation to light emitters in the second group of optical sensor components.

The present invention will become apparent upon reading FIGS. 1 to 15.

BRIEF DESCRIPTION OF THE DRAWINGS

FIG. 3A is a diagrammatic representation showing the measurement of the change in the receiver output attributable to one light emitter in a group of optical sensor components.

FIG. 3B is a diagrammatic representation showing the measurement of the change in the receiver output attributable to the other light emitter in a group of optical sensor components.

FIG. 4A is a diagrammatic representation showing a touch pad device having two groups of optical sensor components separately placed near the top side and the bottom side of the touch pad area.

FIG. 4B is a diagrammatic representation showing a touch pad device having two groups of optical sensor components separately placed near the left side and right side of the touch pad area.

FIG. 8A is a cross-sectional side view showing a touch pad device having an LCD and a light guide on top of the LCD for touching.

FIG. 8B is a cross-sectional side view showing a touch pad device having an LCD and a thin cover on top of the LCD for touching.

FIG. 8C is a cross-sectional side view showing a touch pad device having an LCD and a curved cover on top of the LCD for touching.

DETAILED DESCRIPTION OF THE INVENTION

Figure 1:
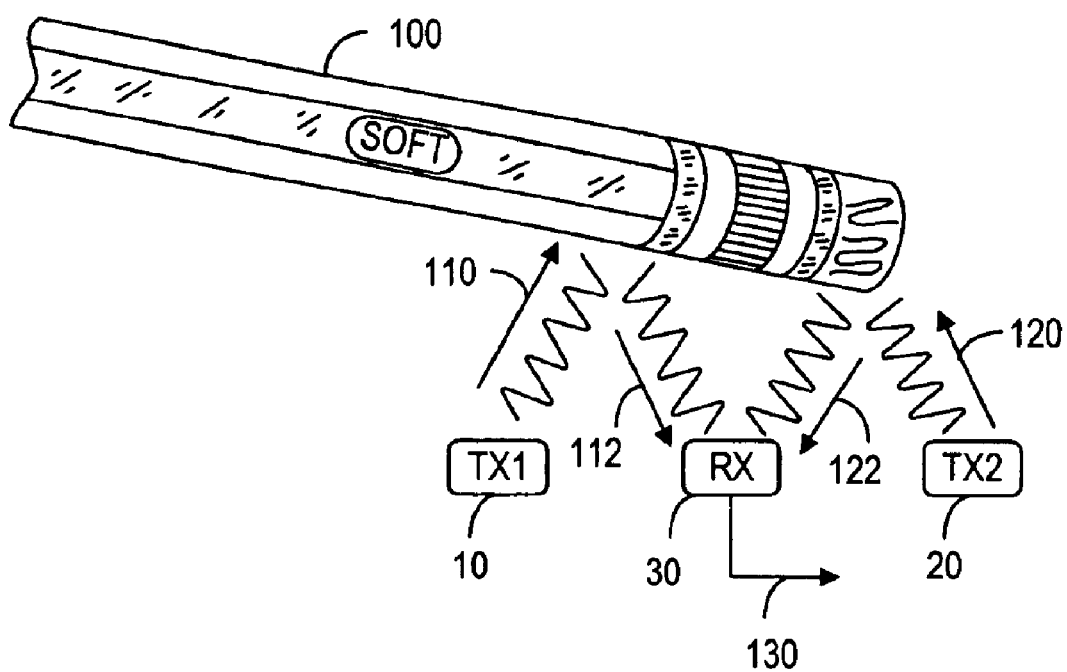
FIG. 1 is a diagrammatic representation showing the general principle of the present invention, where a group of two light emitters and a light receiver is used to detect the presence of a nearby object.

As shown in FIG. 1, two light emitters 10, 20 are positioned on opposite sides of a light receiver 30 in the proximity of a touch pad 5 (see FIGS. 2A–2D). When a user uses an object such as a pencil 100 or a finger 100' (FIG. 2A) to touch the touch pad 5, some light 110 emitted from the emitter 10 encounters the surface of the object 100. Part of the light 110 reflects off the object 100 and is received by the receiver 30. Likewise, some light 120 emitted from the emitter 20 encounters the surface of the object 100 and then reflects off the object 100 to receiver 30. The received portions are denoted by reference numerals 112 and 122. The amount of light received by the receiver 30 can be measured from the output signal 130. If the receiver 30 is not already saturated by ambient light, the presence of the object 100 near the emitters 10, 20 and the receiver 30 would cause a change in the output signal 130. When such a change is detected, it is preferred that the change attributable to the reflected light 112 and that attributable to the reflected light 122 are separately measured by turning off the emitter 20 and emitter 10, respectively. As shown in FIG. 3A, the emitter 20 is turned off or disabled while the change in the received light amount 112 is measured. Likewise, the emitter 10 is turned off or disabled while the change in the received light amount 122 is measured, as shown in FIG. 3B. In FIGS. 3A and 3B, the emitter and receiver involved in the measurement are enclosed by a dashed loop. From the changed amounts, it is usually possible to determine whether the object 100 is closer to the emitter 10 or the emitter 20. In general, when the object 100 is closer to the emitter 10 than the emitter 20, the output signal 130 responsive to the change in the received light amount 112 is larger than that in the received light amount 122. With a series of such measurements, it is possible to track the positions of the object 100 and thus its movement.

Figure 2A:
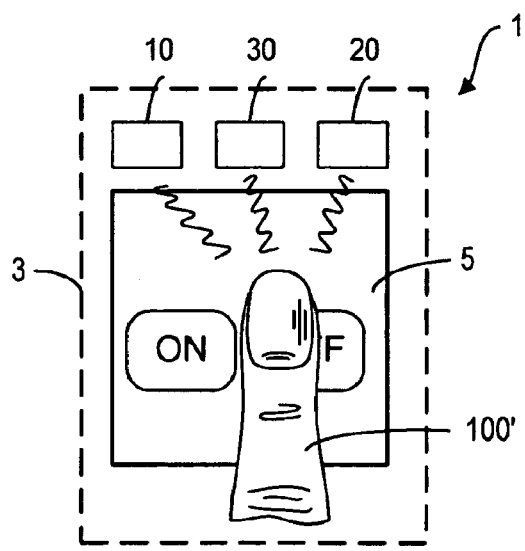
FIG. 2A is a diagrammatic representation showing a touch pad device having a group of optical sensor components placed near the top side of the touch pad area.

FIGS. 2A–2D illustrate different arrangements of the light emitters 10, 20 and the receiver 30 in a touch pad device 1. As shown in FIG. 2A, the touch pad device 1 has a "touch sensitive" area 5 surrounded by a peripheral area 3. If the touch pad device 1 is a resistive-type device, for example, the surface of the "touch sensitive" area must be physically touched in order to change the resistance. However, according to the present invention, the presence of the object 100' is detected by optical sensor components 10, 20 and 30. It is not necessary for the object 100' to physically touch or press the area 5 at a touching point. Thus, the area 5 can be considered as a designated interaction area where a user can use the object 100' to interact with the touch pad device 1 in order to select the input functionality thereof. Furthermore, the phrase "touching the surface", as used hereinafter regarding the touch pad device 1 of the present invention, can be interpreted as "making contact with the surface" or "being adjacent to the surface". Similarly, the location of the "touching point" simply means the selected input location within the touch pad area 5.

Figure 2B:
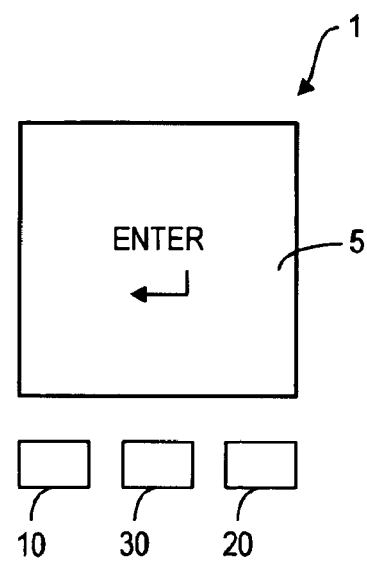
FIG. 2B is a diagrammatic representation showing a touch pad device having a group of optical sensor components placed near the bottom side of the touch pad area.
Figure 2C:
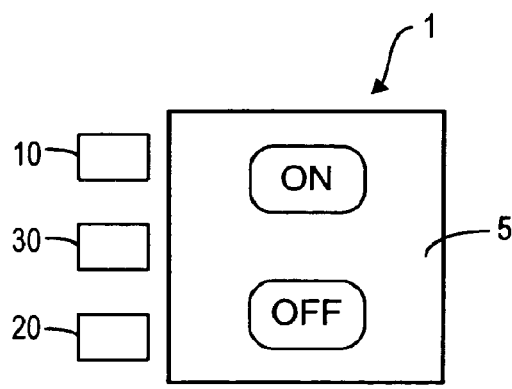
FIG. 2C is a diagrammatic representation showing a touch pad device having a group of optical sensor components placed near the left side of the touch pad area.
Figure 2D:
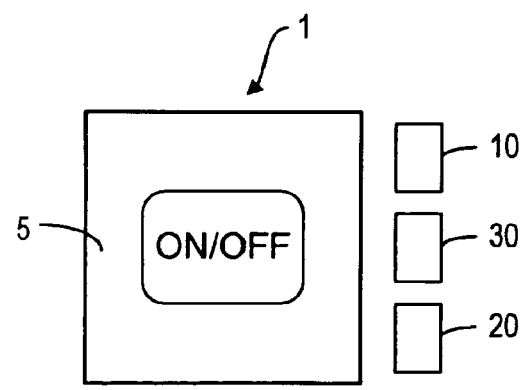
FIG. 2D is a diagrammatic representation showing a touch pad device having a group of optical sensor components placed near the right side of the touch pad area.

The touch pad device 1 can have a single input functionality or multiple input functionality. For example, the touch pad device 1 can be used as an "enter" key in a keyboard, as shown in FIG. 2B, or a toggle ON/OFF switch, as shown in FIG. 2D. With one or more cycles of measurement, it is possible to detect the presence of an object intended for selecting the input functionality of the touch pad device 1. The touch pad device 1, as shown in FIG. 2A, can be used to select the "ON" function or "OFF" function, depending on the location of "touching" point on the touch pad area 5. When the user's finger 100' touches or approaches the pad area 5, as shown in FIG. 2A, it is usually possible to determine from the changes in the output signal of the receiver 30 that the OFF function is selected.

In FIG. 2B, the sensor components 10, 20 and 30 are arranged in the peripheral area 3 near the bottom side of the touch area 5. Likewise, the sensor components 10, 20 and 30 can be arranged near the top side, left side and right side of the touch pad area 5, as shown in FIGS. 2B, 2C and 2D, respectively. With one group of optical sensor components placed in a row in a certain direction, one or more functions can be selected based on the location of the touching point along that direction in one dimension.

It should be noted that with the arrangement of optical sensor components, as shown in FIGS. 2A–2D, the location of the touching point where the object is adjacent to the touch pad area 5 can be determined if the reflection from the object surface does not vary significantly from one point to another. However, if the touching object is a pencil, as shown in FIG. 1, different parts of the pencil may reflect light differently. In that case, a larger amount of change in the received light in the receiver 30 does not necessarily mean that the touching point is closer to one emitter or another. This means that the location of the touching point may not be accurately obtained. With the touch pad device 1 having a single input functionality, one group of sensor components 10, 20 and 30 is generally sufficient to sense the touching of the touch pad area 5. However, when the location of the touching point within the touch area 5 is important in determining the selected function, it is preferred that two groups of three optical sensor elements be placed on opposite sides of the touch pad area 5, as shown in FIGS. 4A and 4B.

In FIG. 4A, emitters 10, 20 and receiver 30 are placed near the top side of the touch pad area 5. Additionally, emitters 12, 22 and receiver 32 are placed near the bottom side of the touch pad area 5. As such, the touch pad device 1 can have more than two functions arranged in two dimensions. For example, the user can select the "UP", "DOWN", "RIGHT" or "LEFT" function by touching at or near the respective arrow. Alternatively, the two groups of optical sensor elements can be separately placed near the right and left sides of the touch pad area 5, as shown in FIG. 4B.

Figure 5A:
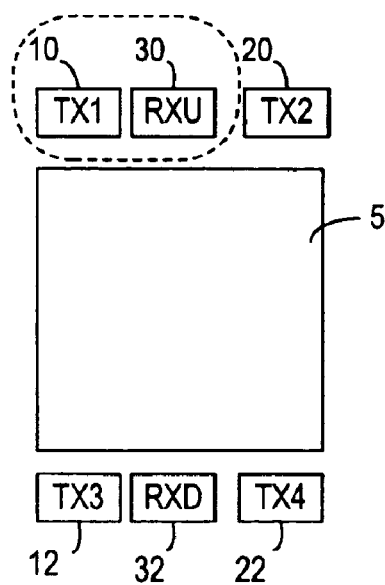
FIG. 5A is a diagrammatic representation showing a touch pad device of FIG. 4A, wherein one emitter and the receiver near the top side are used for measurement.
Figure 5B:
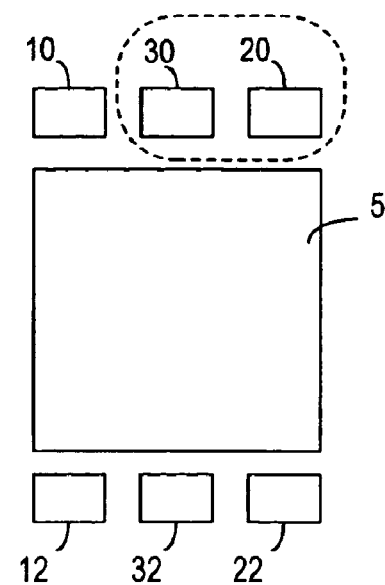
FIG. 5B is a diagrammatic representation showing a touch pad device of FIG. 4A, wherein another emitter and the receiver near the top side are used for measurement.
Figure 5C:
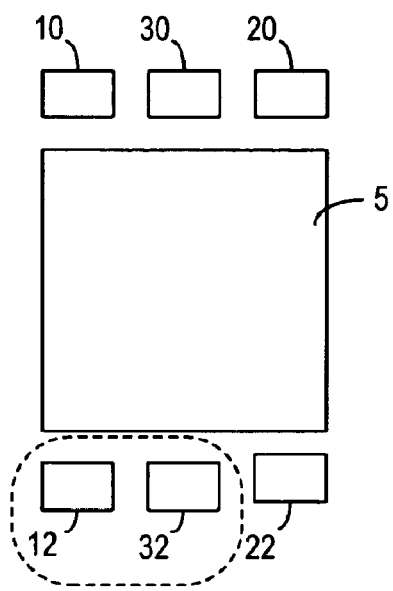
FIG. 5C is a diagrammatic representation showing a touch pad device of FIG. 4A, wherein one emitter and the receiver near the bottom side are used for measurement.
Figure 5D:
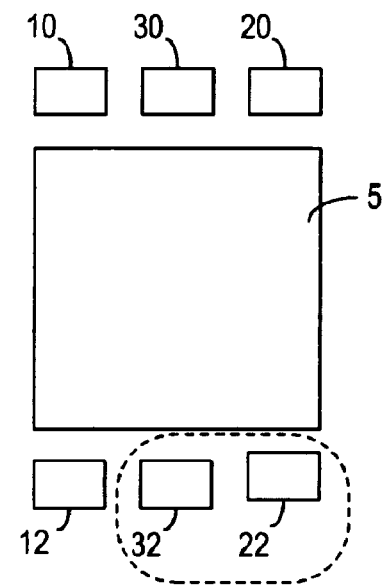
FIG. 5D is a diagrammatic representation showing a touch pad device of FIG. 4A, wherein another emitter and the receiver near the bottom side are used for measurement.
Figure 5E:
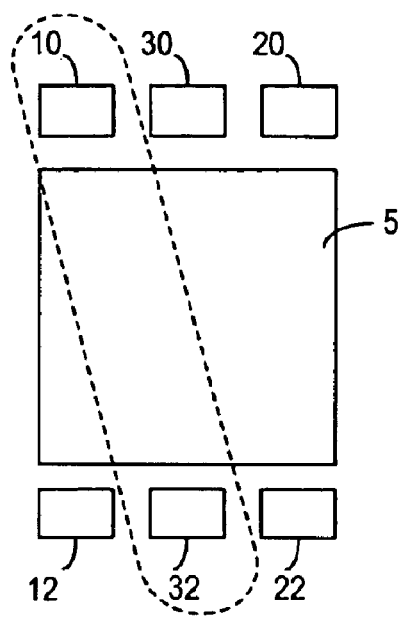
FIG. 5E is a diagrammatic representation showing the touch pad device of FIG. 4A, wherein one emitter near the top side and the receiver near the bottom side are used for measurement.
Figure 5F:
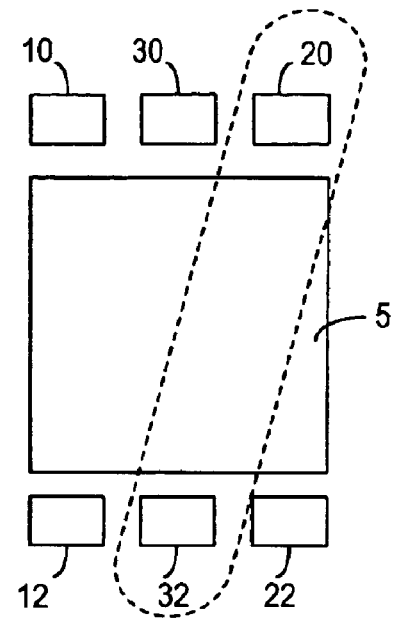
FIG. 5F is a diagrammatic representation showing the touch pad device of FIG. 4A, wherein another emitter near the top side and the receiver near the bottom side are used for measurement.

With four emitters 10, 12, 20, 22 and two receivers 30, 32, it is preferred that a series of measurements, each using a different emitter/receiver pair, be carried out to determine the location of the touching point. For example, the measurement result from the emitter 10 and receiver 30 pair (FIG. 5A) is compared to the measurement result from the emitter 20 and receiver 30 (FIG. 5B) in order to determine the upper horizontal location of the touching point. Additionally, the measurement result from the emitter 12/receiver 32 pair (FIG. 5C) is compared to the measurement result from the emitter 22/receiver 32 pair (FIG. 5D) in order to determine the lower horizontal location of the touching point. From these four measurements (FIGS. 5A–5D), it is possible to calculate the two-dimensional coordinates of the touching point. However, in order to improve the accuracy in location determination, it is preferable to also carry out the following measurements: the emitter 10/receiver 32 pair (FIG. 5E); the emitter 20/receiver 32 pair (FIG. 5F); the emitter 12/receiver 30 pair (not shown) and the emitter 22/receiver 30 pair (not shown). The series of eight measurements are summarized in TABLE I, where TX1=emitter 10, TX2=emitter 20, TX3=emitter 12, TX4=emitter 22, RXU=receiver 30 and RXD=receiver 32.

TABLE I

|   | TX1 | RXU | TX2 | TX3 | RXD | TX4 | measured direction |
|---|-----|-----|-----|-----|-----|-----|--------------------|
| 1 | on  | on  | off | off | off | off | horizontal, upper  |
| 2 | off | on  | on  | off | off | off | horizontal, upper  |
| 3 | off | off | off | on  | on  | off | horizontal, lower  |
| 4 | off | off | off | off | on  | on  | horizontal, lower  |
| 5 | off | on  | off | on  | off | off | diagonal/          |
| 6 | off | off | on  | off | on  | off | diagonal/          |
| 7 | on  | off | off | off | on  | off | diagonal\          |
| 8 | off | on  | off | off | off | on  | diagonal\          |

Figure 14:
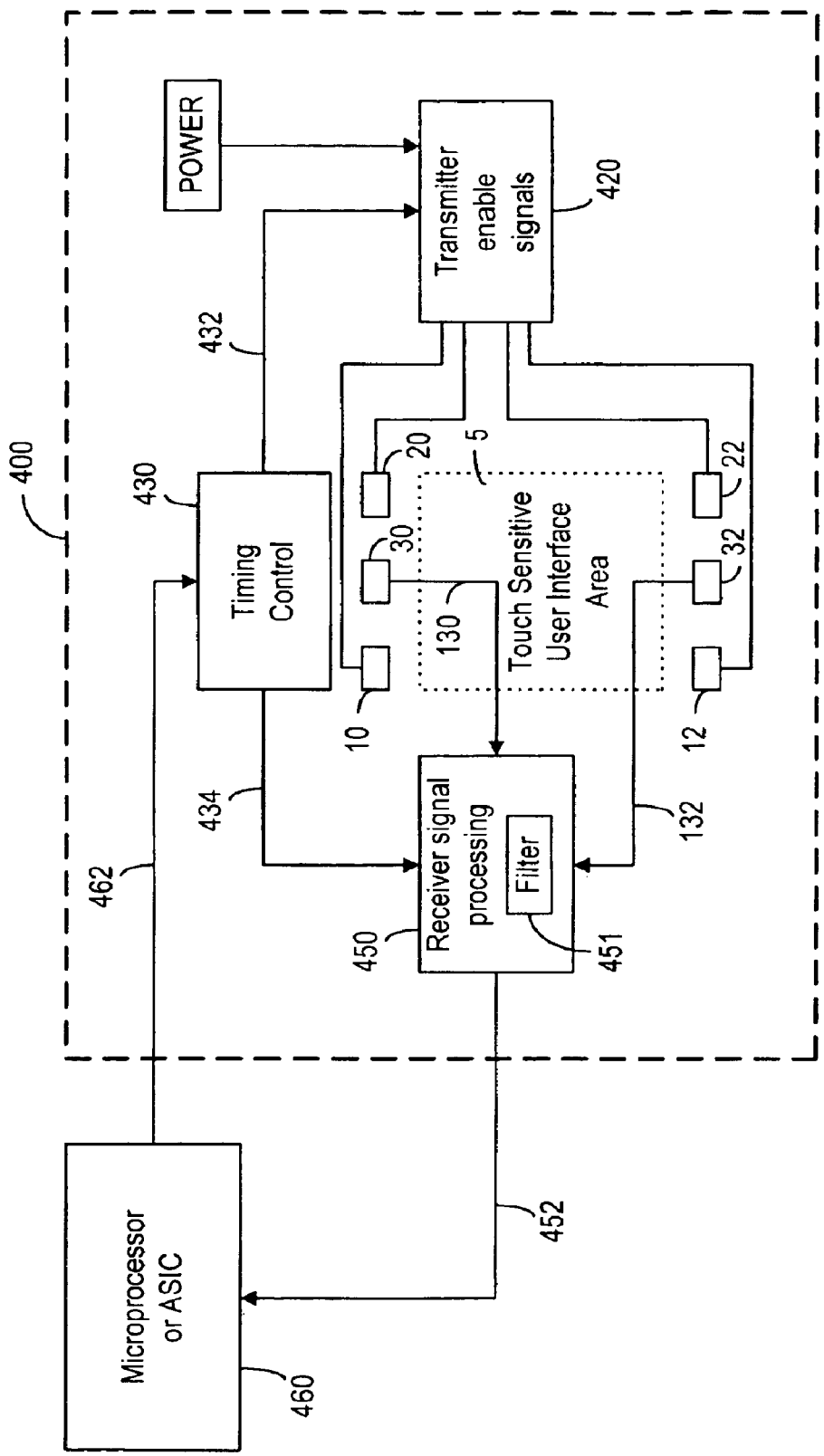
FIG. 14 is a block diagram showing a system for detecting the presence of an object near the touch pad area of a touch pad device, according to the present invention.

As can be seen in TABLE I, only one emitter and one receiver are used, or enabled, for measurement at a time. All the other sensor elements are disabled or not used. The enabling and disabling of the optical sensor components is carried out by a timing control module, as shown in FIG. 14. If the turn-on time is one millisecond for each measurement cycle, it will take only eight milliseconds to complete all the measurement cycles. It is understood that one series of eight measurement cycles can be used to determine the two dimensional coordinates of the touching point with respect to the touch pad area 5. By repeating the same series, the movement of the approaching object can also be tracked.

Figure 5G:
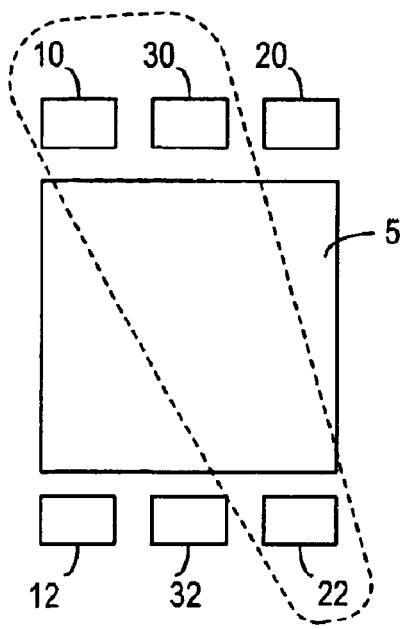
FIG. 5G is a diagrammatic representation showing the touch pad device of FIG. 4A, wherein one emitter and the receiver near the top side, and one emitter near the bottom side are used for measurement.
Figure 5H:
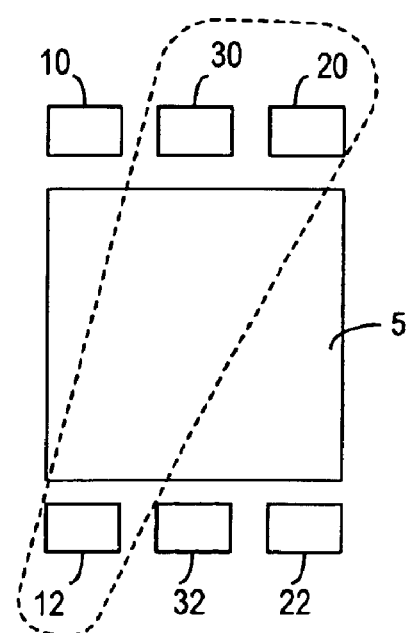
FIG. 5H is a diagrammatic representation showing the touch pad device of FIG. 4A, wherein another emitter and the receiver near the top side, and another emitter near the bottom side are used for measurement.

Optionally, the output from two emitters can be combined in a single measurement. For example, the measurement result from the emitters 10, 22 and the receiver 30 (FIG. 5G) is compared to the measurement result from the emitters 12, 20 and the receiver 30 (FIG. 5H). This comparison is used to determine the horizontal location of the touching point. Likewise, the measurement result from the emitters 10, 22 and the receiver 32 is compared to the measurement result from the emitters 12, 20 and the receiver 32 in order to determined the horizontal location.

Figure 6A:
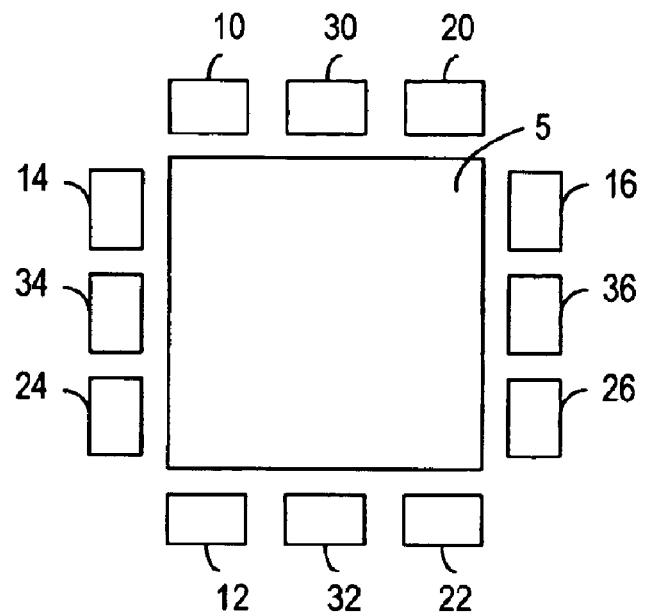
FIG. 6A is a diagrammatic representation showing a touch pad device having four groups of optical sensor components separately placed near four sides of the touch pad area.

Four groups of sensor components can be placed on four sides of the touch pad area 5, as shown in FIG. 6a. Similar to the measurements using the emitters 10, 12, 20, 22 and receivers 30, 32, as shown in FIGS. 5A–5E and summarized in TABLE I, another series of eight measurements can be carried out with emitters 14, 16, 24, 26 and receivers 34, 36. At any one time, only one emitter and one receiver are turned on for measurement. If it takes 1 ms to make one measurement cycle using one emitter/receiver combination, similar to the cycles shown in TABLE I, it requires 16 ms to make all such cycles.

Alternatively, all the emitters 10, 12, 14, 16, 20, 22, 24 and 26 are operated in a pulsed mode of a predetermined frequency. However, the emitters 10, 20, 12 and 22 are operated in a phase complementary of the phase of the emitters 14, 24, 16 and 26. As such, a measurement of the horizontal position can be made simultaneously with a measurement of the vertical position in order to reduce the measurement time.

It is also possible that the operating wavelength of the sensor components 14, 16, 24, 26, 34 and 36 is different from the operating wavelength of the sensor components 10, 12, 20, 22, 30 and 32. In that case, two measurements of different wavelengths can be made simultaneously. For example, the measurement taken with the emitter 10 and the receiver 30 can be carried out simultaneously with the measurement taken with the emitter 14 and the receiver 34. With two wavelengths, the measurement time can be reduced in half.

Figure 6B:
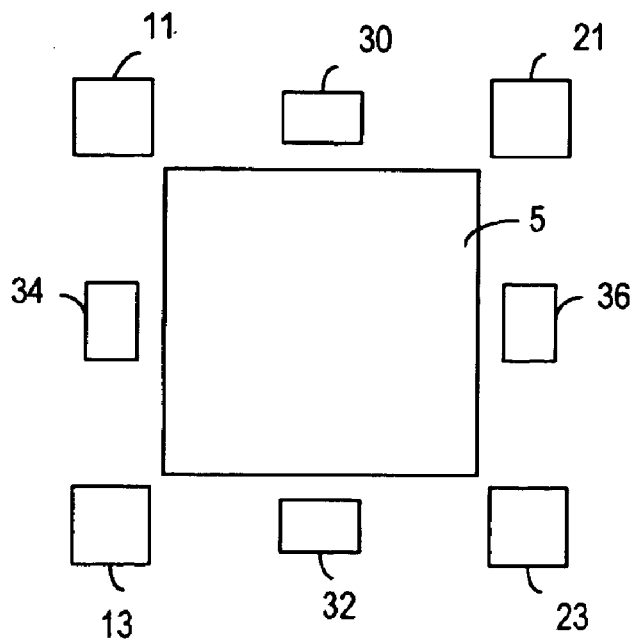
FIG. 6B is a diagrammatic representation showing a touch pad device having four emitters separately placed near the four corners, and four receivers separately placed near the four edges of the touch pad area.

Alternatively, two emitters at each corner can be replaced by a bi-wavelength emitter, as shown in FIG. 6b. For example, the emitters 10 and 14 can be replaced by a bi-wavelength emitter 11. Likewise, bi-wavelength emitters 21, 23 and 13 are used to replace all other single-wavelength emitters.

Figure 7:
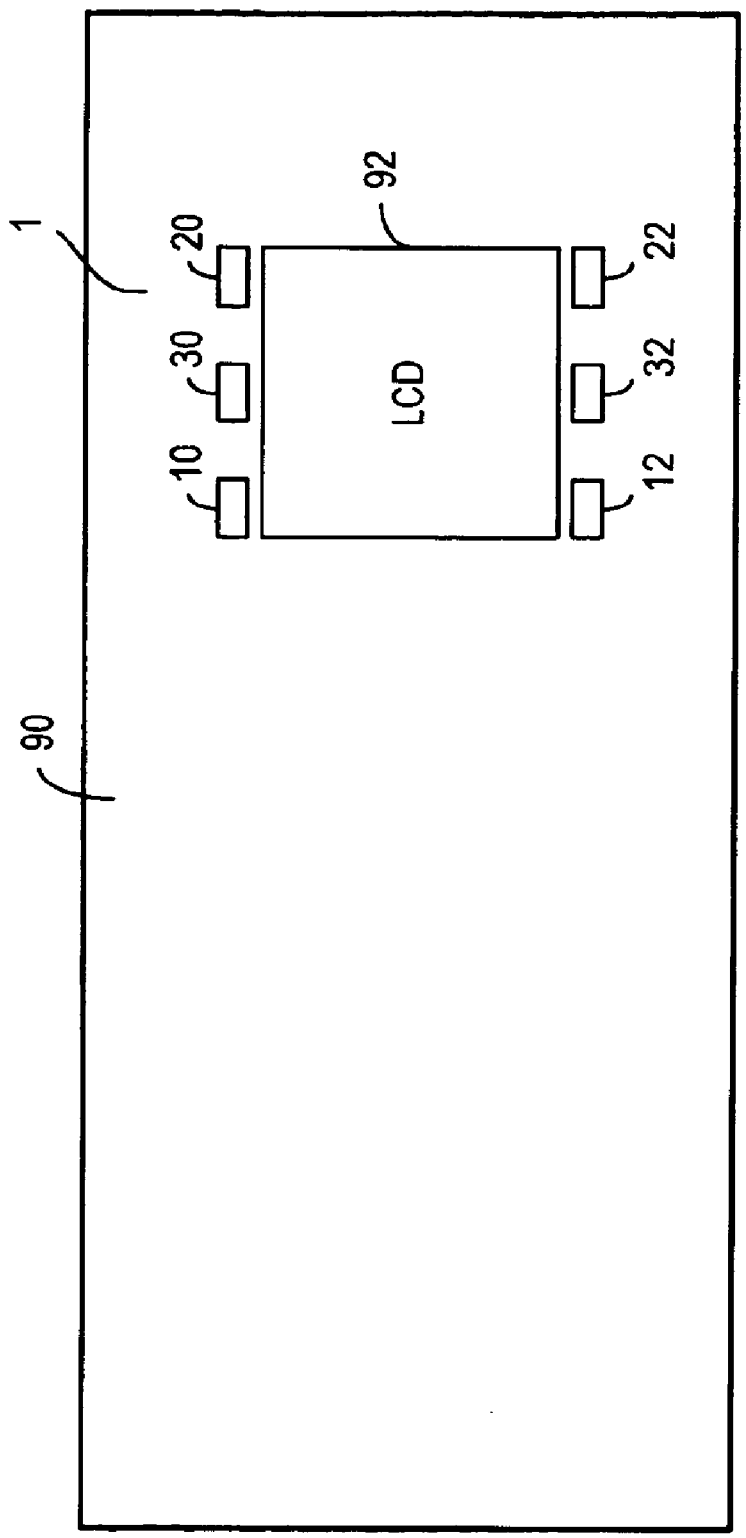
FIG. 7 is a diagrammatic representation showing a touch pad device and two groups of optical sensor components mounted on a printed wire board.
Figure 8D:
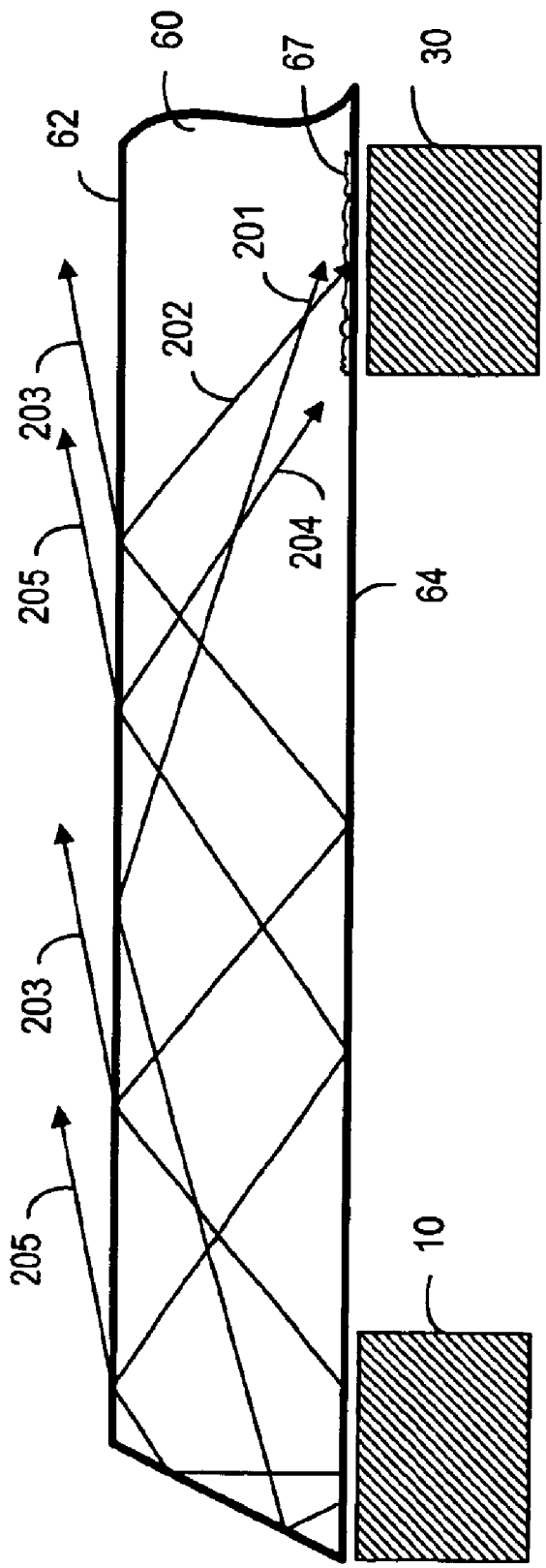
FIG. 8D is a diagrammatic representation showing light transmission within the light guide in the touch pad device of FIG. 8A.

In a mobile device or other electronic device, the touch pad area 5 can be a display panel such as a liquid crystal display (LCD) 92 mounted on a printed circuit board (PCB) or a printed wire board (PWB) 90. As shown in FIG. 7, the optical sensor components 10, 12, 20, 22, 30 and 32 are mounted in the peripheral area surrounding the LCD 92. Preferably, the touch pad device 1 also includes a cover plate to provide a touch surface. As shown in FIG. 8A, a cover plate 60 is placed on top of the LCD 92 and the optical sensor components (only emitters 10 and 12 are shown). The cover plate 60 is designed as a light guide such that light emitted from the emitter 10 can reach the receiver 30 (see FIG. 8D) and light emitted from the emitter 12 can be reach the receiver 32 (not shown) by way of total internal reflection, for example, when the touch pad device 1 is touched by or adjacent to the object 100. In FIG. 8D, the light ray 201 that reaches the receiver 30 is by way of total internal reflection. The light rays 202, 204 reach the receiver 30 by way of partial reflection. When a user's finger 100' (FIG. 2) approaches the cover plate 60, the light rays 203, 205 could encounter the approaching finger and partially reflect off the finger toward the receiver 30. Reflection causes the increase in the received light amount by the receiver 30. However, when the finger makes contact with the upper surface 62 of the cover plate 60, the total internal reflection at the touching point is destroyed, decreasing the received light amount by the receiver 30. Accordingly, both the increase and the decrease of the received light amount by the receiver 30 indicate that touch pad device 1 is "touched". In order to increase the received light amount by the receiver 30 when the surface 62 is not touched, it is possible to introduce some surface defects 67 on the lower surface 64 of the cover plate 60 at the receiver 30, as shown in FIG. 8D. With the cover plate 70, as shown in FIG. 8B, there is very little light from the emitters that reaches the receiver. The approaching and touching of the user's finger is detected by the reflection off the finger. With the cover plate 80 as shown in FIG. 8C, the amount of light emitted by the emitters 10, 20 reaching the receiver could be more than that as shown in FIG. 8B. However, the approaching and touching of the user's finger 100' is mainly detected by the reflection off the finger.

Figure 9A:
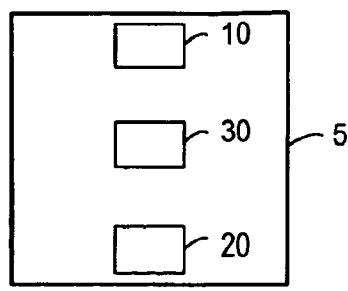
FIG. 9A is a diagrammatic representation showing a touch pad device having one group of optical sensor components placed within the touch pad area.
Figure 9B:
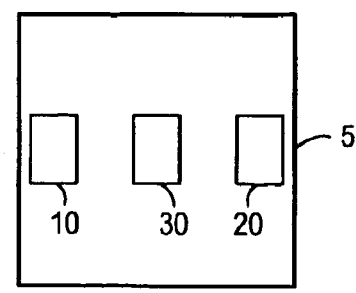
FIG. 9B is a diagrammatic representation showing another touch pad device having one group of optical sensor components placed within the touch pad area.
Figure 9C:
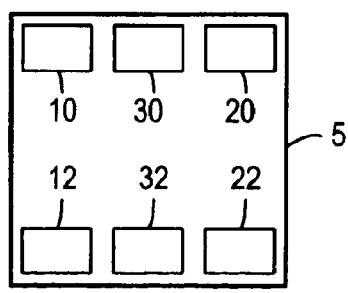
FIG. 9C is a diagrammatic representation showing a touch pad device having two groups of optical sensor components placed within the touch pad area.
Figure 9D:
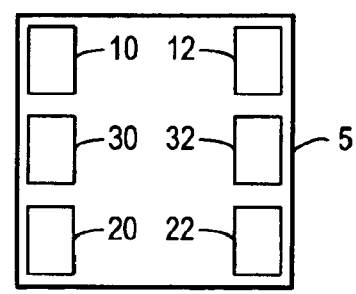
FIG. 9D is a diagrammatic representation showing another touch pad device having two groups of optical sensor components placed within the touch pad area.
Figure 9E:
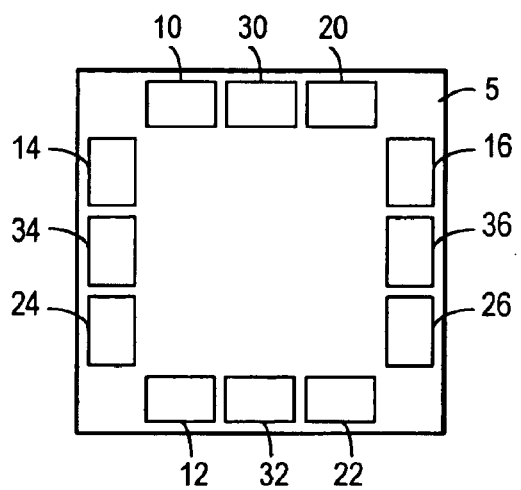
FIG. 9E is a diagrammatic representation showing a touch pad device having four groups of optical sensor components placed within the touch pad area.
Figure 9F:
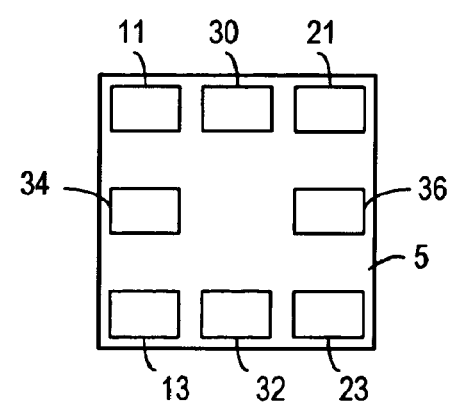
FIG. 9F is a diagrammatic representation showing a touch pad device having four light emitters and four light receivers placed within the touch pad area.

In the embodiments, as illustrated in FIGS. 2A through 8C, all of the optical sensor components are placed outside the touch pad area 5. The touch pad area 5 can be used as a display to provide messages to the user or to indicate the functionality of the touch pad device 1. However, the optical sensor components can also be placed inside the touch pad area 5, as shown in FIGS. 9A–9F. In FIGS. 9A and 9B, one group of optical sensor components, including two emitters 10, 20 and one receiver 30, is used to detect the location of the touching object and track the movement of thereof in one dimension. The measurements to be carried out using these emitters and receiver are similar to those illustrated in FIGS. 2A–3B. In FIGS. 9C and 9D, two groups of similar optical sensor components are placed inside the touch pad area 5. The arrangement of sensor components and the measurements using the components are similar to those illustrated in FIGS. 4A–5H. The arrangement of sensor components in FIG. 9E is similar to that illustrated in FIG. 6A. The arrangement of sensor components in FIG. 9F is similar to that illustrated in FIG. 6B.

Figure 10A:
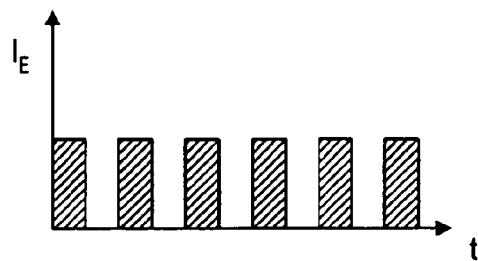
FIG. 10A is a diagrammatic representation showing the light output of a light emitter operated in a pulsed mode.
Figure 10B:
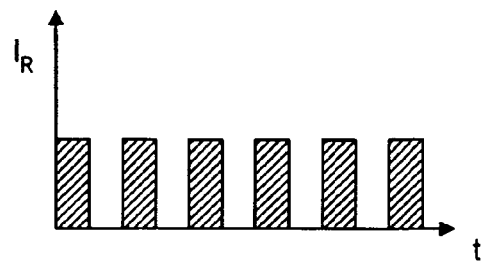
FIG. 10B is a diagrammatic representation showing the output signal of a receiver attributable to a light emitter operated in a pulsed mode.
Figure 10C:
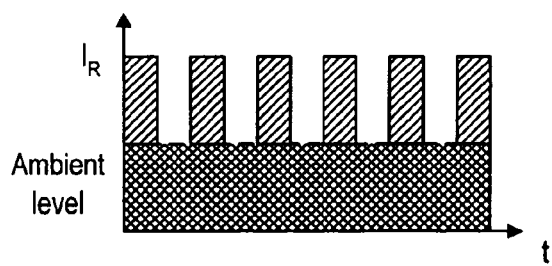
FIG. 10C is a diagrammatic representation showing the output signal of a receiver attributable to a light emitter operated in a pulsed mode and ambient light.

The emitters 10, 11, 12, 13, 14, 16, 20, 21, 22, 23, 24 and 26, as described herein, can be operated in a continuous mode in that the output of the emitters does not contain a high frequency component, similar to the output of an incandescent lamp. Accordingly, the output signal 130 (FIG. 1) of the receiver 30 is also constant or slow-varying. When the emitters are operated in a continuous mode, the output signal of the receiver can be significantly affected by ambient light. This means that the output signal of the receiver may vary from one location to another, regardless of whether the touching object is present at the touch pad device. When the output variation due to ambient light is significant, the detection and sensing of the presence of the touching object becomes difficult, if not impossible. Thus, it is preferable that these emitters be operated in a pulsed mode such that the emitters are turned on and off at regular intervals at a selected frequency. The output intensity $I_E$ of a pulsed emitter is shown in FIG. 10A. Accordingly, the output $I_R$ of the receiver attributable to the output intensity $I_E$ of the pulsed emitter is a series of pulses, as shown in FIG. 10B, when the receiver receives light from the pulsed emitter, regardless of whether the touching object is present at the touching pad device. The receiver and the emitter are in-phase with each other. Usually, as ambient light varies much slower than the frequency of the pulsed frequency, the variation in the output signal of the receiver due to the variation in ambient light is most likely a shift in the base line of the output signal, as shown in FIG. 10C. The output variation due to ambient light can be easily removed using a high-pass filter, for example. Therefore, the variation in the pulsed output signal of the receiver is mainly the result of the reflection or absorption of the approaching object over the touch pad device.

Figure 10D:
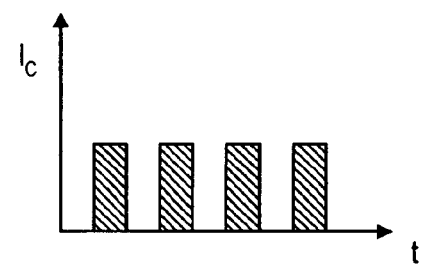
FIG. 10D is a diagrammatic representation showing the light output of a compensation emitter.
Figure 10E:
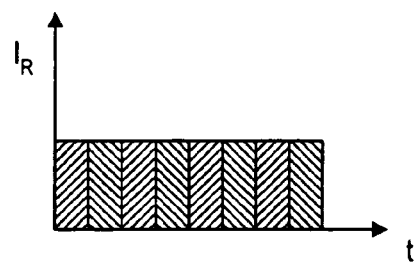
FIG. 10E is a diagrammatic representation showing the output signal of a receiver attributable to a light emitter and a compensation emitter operated in a pulsed mode with complementary phases.
Figure 11:
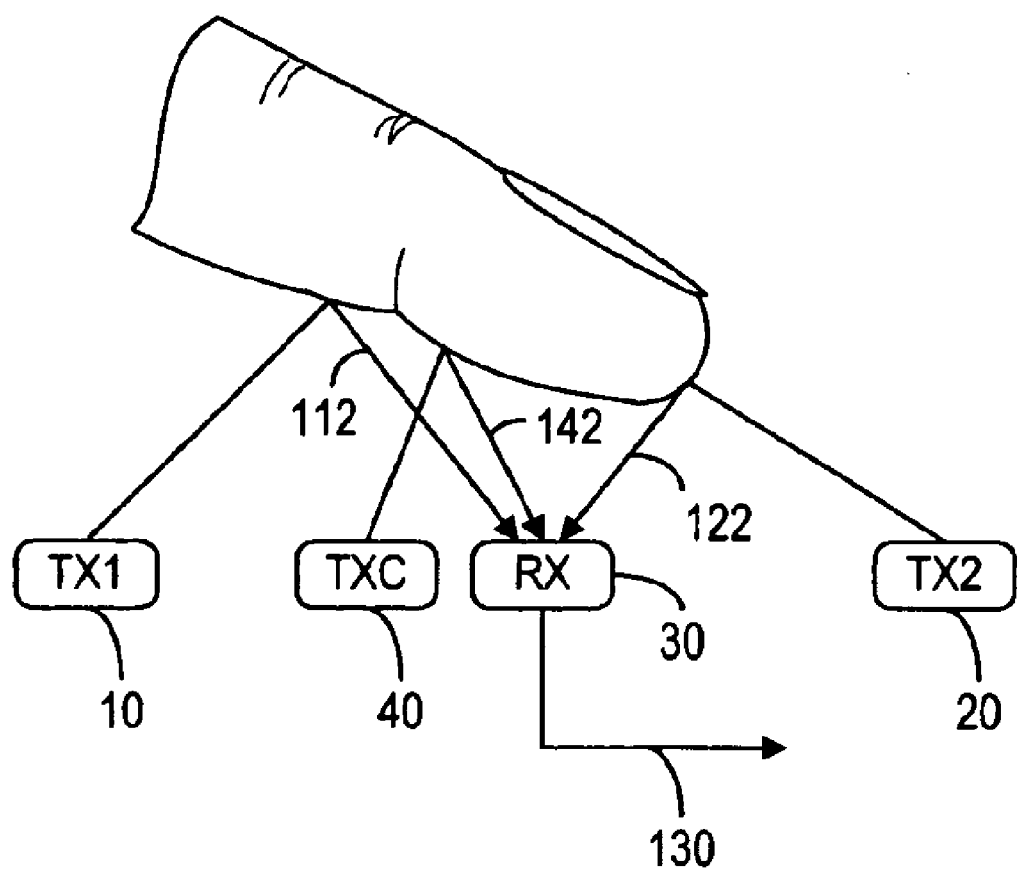
FIG. 11 is a diagrammatic representation showing the reflection of light emitted from two light emitters and a compensation emitter off a finger to reach a light receiver.

It should be noted that the output signal of the receiver 30 attributable to a pulsed emitter 10 arranged in a touch pad device, such as that illustrated in FIG. 8D, can change if the upper surface 62 of the cover plate 60 is wet or dirty. Such a change could complicate the detection and sensing of the touching object. Thus, it is also preferable to place a compensation emitter 40 adjacent to the receiver 30, as shown in FIG. 11. The phase of the compensation emitter 40, as shown in FIG. 10D, is complementary to the phase of the emitters 10, 20. In FIG. 10D, $I_C$ denotes the output intensity of the compensation emitter 40. The compensation emitter 40 is controlled such that when the touching object is not present, the output signal $I_E$ of the receiver 30 attributable to the emitters 10, 20 is substantially equal to that attributable to the compensation emitter 40. With such a compensation emitter, the output signal of the receiver 30 does not contain a high frequency component, as shown in FIG. 10E, when the touching object is not present. Thus, after being filtered by a high-pass filter, the output signal of the receiver 30 is substantially zero. With such a compensation emitter, the output signal of the receiver 30 is substantially unaffected by the surface condition of the cover plate 60. The use of a compensation emitter has been disclosed in U.S. Pat. No. 5,666,037 entitled "Arrangement for measuring or detecting a change in a retro-reflective element" to Gerd Reime, and in EP 0 706 648 B1 of the same title to the same inventor.

Best Mode

Figure 12A:
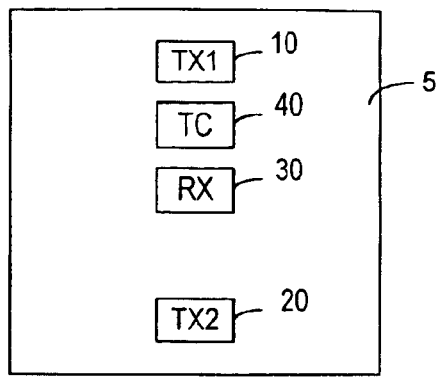
FIG. 12A is a diagrammatic representation showing a touch pad device having one group of optical sensor components operated in a pulsed mode including two light emitters, one compensation emitter and one light receiver.
Figure 12B:
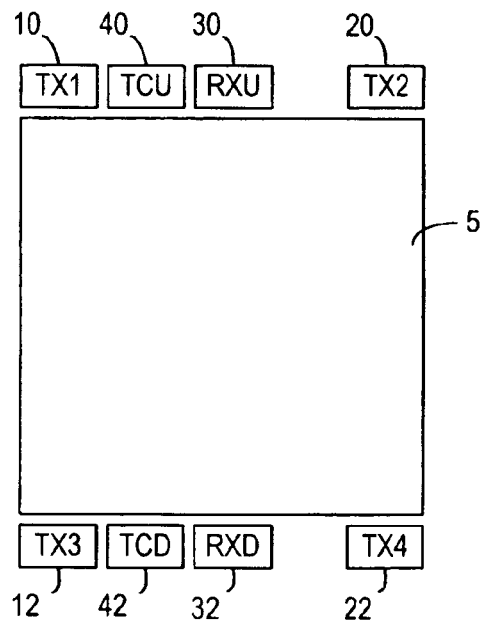
FIG. 12B is a diagrammatic representation showing a touch pad device having two groups of optical sensor components operated in a pulsed mode placed near the touch pad area.
Figure 12C:
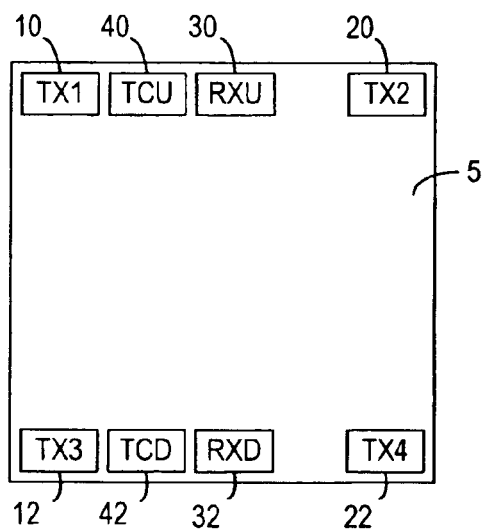
FIG. 12C is a diagrammatic representation showing a touch pad device having two groups of optical sensor components operated in a pulsed mode placed within the touch pad area.

In order to use the above-mentioned phase compensation technique, it is preferred that adjacent to each of the receivers 30, 32, 34, 36, as shown in FIGS. 1–7, 8D–9E, a compensation emitter is placed so as to balance out the output of the corresponding emitters (in a pulsed mode). The placement of the compensation emitter is similar to that shown in FIG. 11. An exemplary arrangement of the compensation emitter is shown in FIGS. 12A–12C. As shown, a compensation emitter 40 is placed adjacent to the receiver 30, and a compensation emitter 42 is placed adjacent to the receiver 32. In measurements, the compensation emitter adjacent to the corresponding receiver is turned on or off together with that receiver. For example, in the measurement illustrated in FIG. 5E, the compensation emitter adjacent to the receiver 32 is turned on while the compensation emitter adjacent to the receiver 30 is turned off.

Preferably, the light emitters 10, 12, 14, 16, 20, 22, 24 and 26 are light-emitting diodes (LEDs) operated in an infrared (IR) or far-IR frequency range.

Alternative Embodiments

Figure 13A:
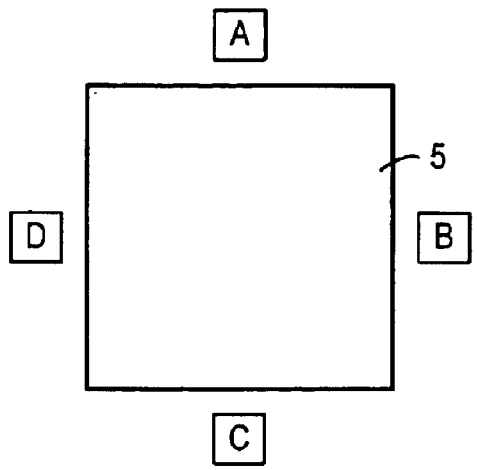
FIG. 13A is a diagrammatic representation showing a touch pad device having four transceivers placing near the four edges of the touch pad area.

The optical sensor components, as shown in FIGS. 1–12B, are dedicated components in that an emitter cannot be used as a receiver, and a receiver cannot be used as an emitter. However, it is possible to use optical transceivers in a touch pad device for detecting the presence of a touching object. As shown in FIGS. 13A–13D, four transceivers A, B, C and D are arranged at the four edges or corners of the touch pad area 5. Each of the transceivers A, B, C and D can be selectively used either as an emitter or a receiver, but not both. The selected function of the transceiver is denoted by a letter in the accompanying parenthesis: (t)=regular emitter or transmitter, (c)=compensation emitter, and (r)=receiver. With the arrangements as shown in FIGS. 13A and 13C, a series of measurements is carried out to determine the location of a touching point as follows:

I. A(t), B(t), C(r), D(c)
 II. A(t), B(t), C(c), D(r)
 III A(r), B(c), C(t), D(t)
 IV A(c), B(r), C(t), D(t)

As such, the combination of (I+II) yields a first horizontal position; the combination of (III+IV) yields a second horizontal position; (I+II)−((III+IV) yields the vertical position; and (I+II)+(III+IV) yields the horizontal position. For a sufficient large touch pad area, it is desirable to further include the following measurements:

V. A(t), B(r), C(c), D(t)
 VI. A(t), B(c), C(r), D(t)
 VII. A(r), B(t), C(t), D(c)
 VIII. A(c), B(t), C(t), D(r)

As such, the combination of (V+VI) yields a first vertical position; (VII+VIII) yields a second vertical position; and (V+VI)+(VII+VIII) yields the vertical position.

Figure 13B:
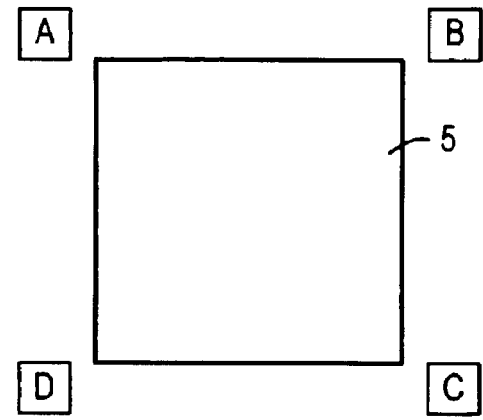
FIG. 13B is a diagrammatic representation showing a touch pad device having four transceivers placing near the four corners of the touch pad area.
Figure 13C:
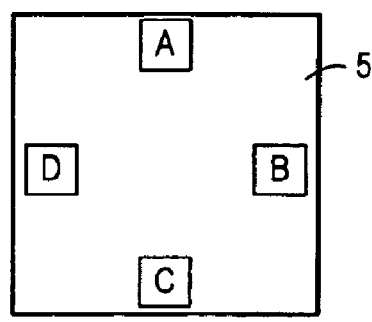
FIG. 13C is a diagrammatic representation showing a touch pad device having four transceivers placing inside the four edges of the touch pad area.
Figure 13D:
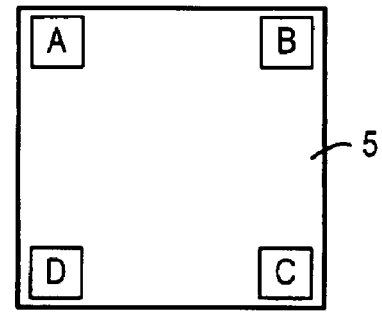
FIG. 13D is a diagrammatic representation showing a touch pad device having four transceivers placing inside the four corners of the touch pad area.

The measurements regarding the arrangements, as shown in FIGS. 13B and 13D, are similar.

FIG. 14 is a block diagram showing the basic components 400 in a system for detecting the presence of the touching object 100 and determining the location of the touching point on the touch pad area 5, according to the present invention. A microprocessor or ASIC 460 is connected to the components 400 to control the measurement on the touch pad device and make use of the measurement results therefrom. As shown, the touch pad device includes a touch pad area 5 with two groups of sensor components separately placed at the top side and the bottom side of the touch pad area 5, similar to FIG. 4A. The emitters 10, 12, 20, 22 are connected to an enabling module 420, which selectively enables or disables the emitters for measurements. The output signal 130 from the receiver 30 and the output signal 132 from the receiver 32 are conveyed to a signal-processing module 450. The enabling module 420 and the signal-processing module 450 are under the control of a timing control module 430. For example, in order to make the measurement cycle 5 as shown in TABLE I or FIG. 5E, the timing control module sends out a control signal 432 to the enabling module 420 for turning off or disabling the emitters 12, 20, 22 and enabling the emitter 10. At the same time, the timing control module 430 sends out a control signal 434 to the signal processing module 450 such that only the output signal 132 from the receiver 32 is used. Based on the output signal 132, the signal processing module 450 sends measurement information 452 to the microprocessor 460. After receiving the measurement information 452, the microprocessor 460 sends out a command signal 462 to the timing control 430 for starting the measurement of the next cycle. After all eight measurement cycles are completed, the microprocessor 460 determines the location of the touching point. If the emitters 10, 12, 20 and 22 are operated in a pulsed mode of a predetermined frequency, then the signal-processing module 450 also comprises a filtering means to allow mainly the frequency component of the predetermined frequency in the output signal 130 and 132 to be measured.

Figure 15:
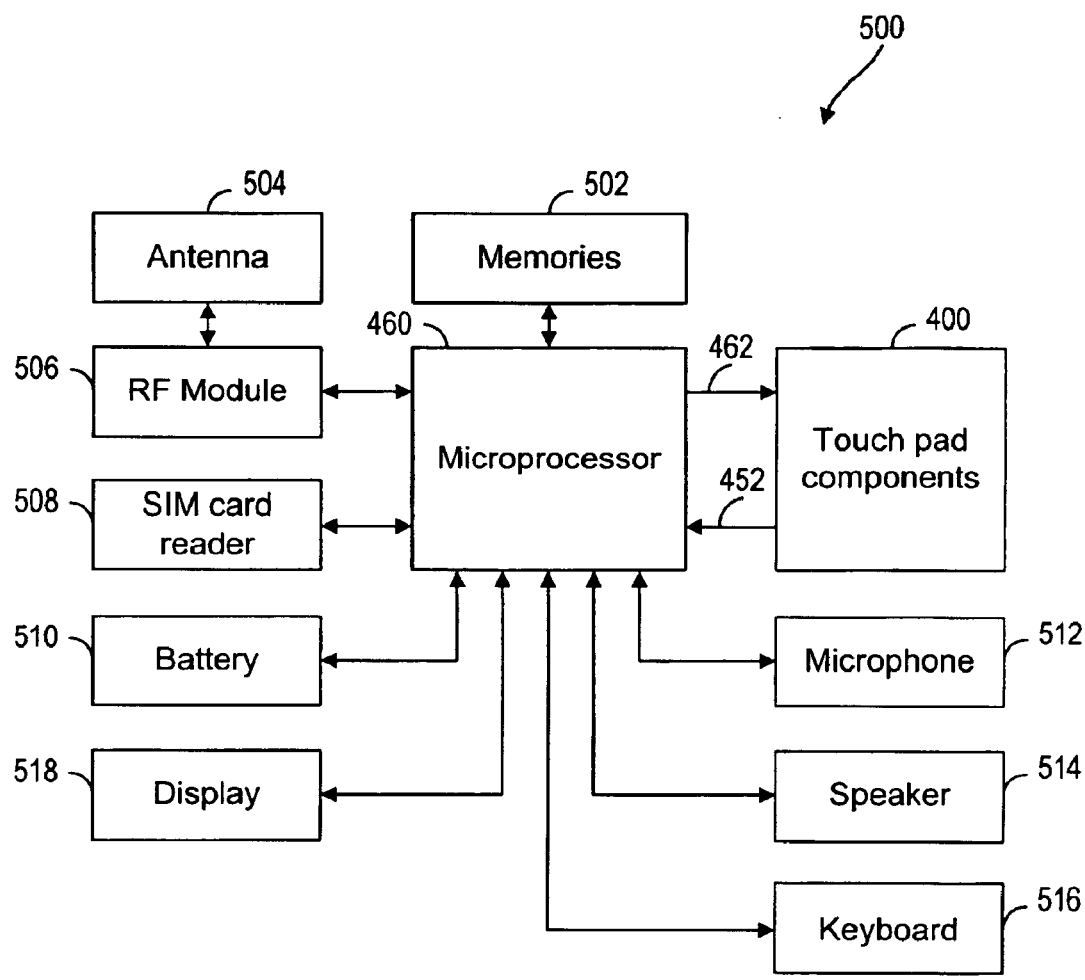
FIG. 15 is a block diagram showing a mobile phone comprising a touch pad device, according to the present invention.

FIG. 15 shows a portable electronic device, such as a mobile phone 500 that has a touch pad device of the present invention. As shown, the mobile phone 500 includes the microprocessor 460 and the basic components 400, as shown in FIG. 14. In addition, the mobile phone 500 comprises an antenna 504 connected to an RF module 506 for receiving and transmitting RF signals; a battery 508, a microphone 512, a speaker 514 and a keyboard 516. Also, the mobile phone 500 may have a SIM card reader 508 and other electronic devices, such as display 518. The additional components shown in FIG. 15 are known in the art and not part of the present invention. FIG. 15 is used to illustrate how a touch pad device can be used on an electronic device such as a mobile phone.

The touch pad device 1, according to the present invention, has many applications. The touch pad device 1 can be used as a key in a keyboard, as illustrated in FIG. 2B; a switch with alternate functions, as illustrated in FIG. 2D; and a control switch or device with two or more functions as illustrated in FIGS. 2A and 2C. The touch pad device 1, as illustrated in FIG. 4A, can be used as a micro-mouse or a pointing device, for example. In order to move an object or a cursor to a desired location on a screen, the user can touch the touch pad area 5 at the designated locations to move the cursor up, down, left or right. It should be noted that because the touch pad device, according to the present invention, can be used to track the movement of the touching object, it can be used to input information using the movement. A touch pad device with only one group of optical sensor components (one receiver and two emitters, with or without a compensation emitter) can detect the movement in one dimension. Such a touch pad device can be used as a volume control switch, for example, and the up/down motion or left/right motion of the touching object can be used to increase or decrease the volume of sound. The same device can be used as a light-dimming switch to allow a user to brighten or dim a light, or a zoom control switch to enlarge or reduce a displayed image on a screen. A touch pad device with two or more groups of optical sensor components can be used to track the movement of the touching device in two dimensions. Such a touch pad device can be used as a micro-mouse where the cursor can be moved in any direction on the screen following the movement of the touching object. The two-dimensional movement of the touching object can be linear, circular or irregular. Thus, a touch pad device with two or more groups of optical sensor components can be used as a virtual rotation knob, a virtual writing pad or a virtual drawing board.

Instead of being rectangular, the touch pad area can be round, elliptical, polygonal or of a irregular shape.

It should be noted that the transmission and reflection of light, as depicted in the drawings, is for illustrative purposes only. For example, the light rays shown in FIG. 11 seem to obey specular reflection. However, a finger has a diffuse surface and light rays can penetrate into the skin. Thus, how light rays interact with the finger is a complex matter.

The present invention provides a method and device for detecting and sensing the presence of a touching object and the movement thereof in or near a touch pad area. The touch pad device 1, as depicted in FIGS. 2A–13D, is used to provide a time-dependent signal based on a series of measurements. The scope of the present invention includes any applications and products that use the disclosed method and/or device using that time dependent signal. The time duration of the signal, the number of cycles in the series of measurements, and the time duration of each cycle, depend on the applications and products. Furthermore, the output intensity, wavelength and other optical characteristics of the light emitters, the sensitivity and the optical response of the light receivers, and the optomechanical arrangement of these optical sensor components in a touch pad device, according to the present invention, may vary from one application to another.

In the embodiments, as depicted in FIGS. 4A and 4B, it is preferred that the light emitters 10, 20, 12 and 22 can be operated in a pulsed mode of the same frequency and the same phase. Alternatively, the light emitters 10 and 20 are operated in a first phase and the light emitters 12 and 22 are operated in a second phase complementary of the first phase so that the measurement of cycle 1 (TABLE I) can be made simultaneously with the measurement of cycle 3 or cycle 4, for example. Likewise, the measurement of cycle 5 can be made simultaneously with the measurement of cycle 6. Thus, the measurement time for the entire 8 cycles can be reduced in half.

It is preferred the optical sensor components are solid state devices such as light-emitting diodes, optoelectronic sensors and transceivers operated at IR or far-IR frequencies. However, optical sensor components operated at other frequencies can also be used.

Thus, although the invention has been described with respect to a preferred embodiment thereof, it will be understood by those skilled in the art that the foregoing and various other changes, omissions and deviations in the form and detail thereof may be made without departing from the spirit and scope of this invention.

What is claimed is:

1. A method of sensing and detecting the presence of an object at a touch pad device having one or more input functions, wherein the touch pad device has a designated interaction area for allowing a user to use the object to interact with the touch pad device for activating said one or more input functions depending on a location of the object, the designated interaction area having a periphery, and wherein the touch pad device has a surrounding area substantially surrounding the periphery of the designated interaction area, said method comprising the steps of:

providing in the surrounding area at least one group of optical sensor components including a first light emitter, a second light emitter and a light receiver in the touch pad device at different locations thereof such that the receiver is capable of receiving a first amount of light emitted by the first light emitter and reflected by the object and a second amount of light emitted by the second light emitter and reflected by the object; wherein when the object is present at the touch pad device, causing a change in the first amount of light and the second amount of light, measuring separately the change in the first amount of light and the change in the second amount of light for providing a first signal and a second signal indicative of the respective changes; and determining the location of the object in the designated interaction area in relation to the first light emitter and the second light emitter by comparing the change in the first amount of light and the change in the second amount of light based on the first and second signals, wherein the change in the first amount of light and the second amount of light is an increased amount when the object is present at the touch pad device.

2. The method of claim 1, wherein the measuring and determining steps are carried repeatedly for providing changes in the location of the object as a function of time.

3. The method of claim 1, wherein the designated interaction area has an upper side and a lower side, and said group of optical sensor components is placed on either the upper side or the lower side.

4. The method of claim 1, wherein the designated interaction area has a left side and a right side, and said group of optical sensor components is placed on either the left side or the right side.

5. The method of claim 1, wherein the first and second light emitters are operated in a pulsed mode of a predetermined frequency so that the changes in the first amount of light and the second amount of light contain a frequency component of the predetermined frequency.

6. The method of claim 1, wherein the touch pad device further includes a further group of optical sensor components including a third light emitter, a fourth light emitter and a further light receiver in the touch pad device at different locations thereof separating said first and second light emitters and the light receiver such that the further receiver is capable of receiving a third amount of light emitted by the third light emitter and a fourth amount of light emitted by the fourth light emitter; wherein when the object is present at the touch pad device, causing a change in the third amount of light and the fourth amount of light said method further comprising the steps of:

measuring separately the change in the third amount of light and the change in the fourth amount of light for providing a third signal and a fourth signal indicative of the respective changes; and determining the location of the object in the designated interaction area in relation to the third light emitter and the fourth light emitter based on the third and fourth signals.

7. The method of claim 6, wherein the designated interaction area has an upper side and a lower side, and wherein said group of optical sensor components is placed at the upper side and said further group of optical sensor components is placed at the lower side.

8. The method of claim 6, wherein the designated interaction area has a left side and a right side, and wherein said group of optical sensor components is placed at the left side and said further group of optical sensor components is placed at the right side.

9. The method of claim 6, wherein the first, second, third and fourth light emitters are operated in a pulsed mode of a predetermined frequency so that the changes in the first amount, the second amount, the third amount and the fourth amount of light contain a frequency component of the predetermined frequency.

10. The method of claim 6, wherein the measuring steps regarding the first amount, second amount, third amount and fourth amount of light and the determining steps based on the first signal, the second signal, the third signal and the fourth signal are carried out repeatedly for providing changes in the location of the object as a function of time.

11. The method of claim 1, wherein the touch pad device has a display screen disposed in the inner area for showing said one or more input functions.

12. A touch pad device to be used in conjunction with a measurement device, wherein the touch pad device has a designated interaction area for allowing a user to use an object to interact with the designated interaction area in order to activate one or more functions associated with the touch pad device dependent on a location of the object, the designated interaction area having a periphery wherein the touch pad device also has a surrounding area substantially surrounding the periphery of the designated interaction area, said touch pad device comprising:

a light receiver provided in the surrounding area, and a first light emitter and a second light emitter provided respectively at a first location and a second different location in the surrounding area in relationship to the light receiver such that the light receiver is capable of receiving a first amount of light emitted by the first light emitter and reflected by the object, and a second amount of light emitted by the second light emitter and reflected by the object, wherein when the object is present at the touch pad device, it causes a change in the first amount of light and the second amount of light, and wherein the change in the first amount of light and the change in the second amount of light are separately measured by the measurement device and these measured changes are compared for determining the location of the object in the designated interaction area in relation to the first light emitter and the second light emitter, wherein the change in the first amount of light and the second amount of light is an increased amount when the object is present at the touch pad device.

13. The touch pad device of claim 12, wherein the first and second light emitters are operated in a pulsed mode of a predetermined frequency so that the changes in the first amount of light and the second amount of light contain a frequency component of the predetermined frequency.

14. The touch pad device of claim 12, wherein the light emitters are light-emitting diodes.

15. The touch pad device of claim 12, wherein the light emitters are operated in an infrared frequency range.

16. The touch pad device of claim 12, wherein the designated interaction area has an upper side and a lower side and the first light emitter, the second light emitter and the light receiver are provided at the upper side, said touch pad device further comprising:

a further light receiver provided at the lower side;

a third light emitter provided at a third location adjacent the light receiver; and a fourth light emitter provided at a fourth location adjacent the light receiver different from the third location such that the further light receiver is capable of receiving a third amount of light emitted by the third light emitter and a fourth amount of light emitted by the fourth light emitter, wherein when the object is present at the touch pad device, causes a change in the third amount of light and the fourth of light, the change in the third amount of light and the change in the fourth amount of light being separately measured by the measurement device for further determining the location of the object in the designated interaction area in relation to the third light emitter and the fourth light emitter.

17. The touch pad device of claim 12, wherein the designated interaction area has a left side and a right side and the first light emitter, the second light emitter and the light receiver are provided at the left side, said touch pad device further comprising:

a further light receiver provided at the right side;

a third light emitter provided at a third location adjacent the light receiver; and a fourth light emitter provided at a fourth location adjacent the light receiver different from the third location such that the further light receiver is capable of receiving a third amount of light emitted by the third light emitter and a fourth amount of light emitted by the fourth light emitter, wherein when the object is present at the touch pad device, causes a change in the third amount of light and the fourth of light, the change in the third amount of light and the change in the fourth amount of light being separately measured by the measurement device for further determining the location of the object in the designated interaction area in relation to the third light emitter and the fourth light emitter.

18. The touch pad device of claim 12, wherein the inner area has a display screen for showing said one or more functions.

19. The touch pad device of claim 18, wherein the display screen comprises an LCD.

20. A system for sensing and detecting the presence of an object at a touch pad device, wherein the touch pad device has a designated interaction area for allowing a user to use the object to interact with the touch pad device in order to activate one or more functions associated with the touch pad device, the designated area having a periphery, and wherein the touch pad device also has a surrounding area substantially surrounding the periphery of the designated interaction area, said system comprising:

at least one group of optical sensor components including a first light emitter, a second light emitter and a light receiver in the surrounding area at different locations thereof such that the light receiver is capable of receiving a first amount of light emitted by the first light emitter and reflected by the object, and a second amount of light emitted by the second light emitter and reflected by the object, wherein the first amount of light and the second amount of light are caused to change when the object is present at the touch pad device;

a measurement module, operatively connected to the light receiver, for separately measuring the change in the first amount of light and the change in the second amount of light for providing a first signal and a second signal indicative of the respective changes so as to determine the location of the object in the designated interaction area in relation to the first light emitter and the second light emitter by comparing the first and second signals, wherein the change in the first amount of light and the second amount of light is an increased amount when the object is present at the touch pad device.

21. The system of claim 20, wherein the measurement module comprises a timing control module for disabling the first light emitter when the change in the second light amount is measured and disabling the second light emitter when the change in the first light amount is measured.

22. The system of claim 20, wherein the first light emitter and the second light emitter are operated in a pulsed mode of a predetermined frequency so that the changes in the first amount and the second amount contain a frequency component of the predetermined frequency, and wherein the measurement module further comprises a filtering module for providing the frequency component.

23. A method of sensing and detecting the presence of an object at a touch pad device having one or more input functions, wherein the touch pad device has a designated interaction area for allowing a user to use the object to interact with the touch pad device for performing said one or more input functions, said method comprising the steps of:

providing at least one group of optical sensor components including a first light emitter, a second light emitter and a light receiver in the touch pad device at different locations thereof such that the receiver is capable of receiving a first amount of light emitted by the first light emitter and a second amount of light emitted by the second light emitter; wherein when the object is present at the touch pad device, causing a change in the first amount of light and the second amount of light, measuring separately the change in the first amount of light and the change in the second amount of light for providing a first signal and a second signal indicative of the respective changes; and determining the location of the object in the designated interaction area in relation to the first light emitter and the second light emitter based on the first and second signals, wherein the first and second light emitters are operated in a pulsed mode of a predetermined frequency so that the changes in the first amount of light and the second amount of light contain a frequency component of the predetermined frequency, and wherein the pulsed mode of the first and second light emitters are operated in a pulsed mode of a predetermined frequency with a first phase and said group of optical sensor components further includes a third light emitter positioned adjacent to the light emitter to provide a third amount of light to the light receiver, and wherein the third light emitter is operated in said pulsed mode with a second phase complementary of the first phase and the third light emitter is controlled such that the third amount of light is substantially equal to a sum of the first amount and the second amount when the object is not present at the touch pad device so as to reduce a frequency component in the sum of the first, second and third amounts.

24. A method of sensing and detecting the presence of an object at a touch pad device having one or more input functions, wherein the touch pad device has a designated interaction area for allowing a user to use the object to interact with the touch pad device for performing said one or more input functions, said method comprising the steps of:

providing at least one group of optical sensor components including a first light emitter, a second light emitter and a light receiver in the touch pad device at different locations thereof such that the receiver is capable of receiving a first amount of light emitted by the first light emitter and a second amount of light emitted by the second light emitter; wherein when the object is present at the touch pad device, causing a change in the first amount of light and the second amount of light, measuring separately the change in the first amount of light and the change in the second amount of light for providing a first signal and a second signal indicative of the respective changes; and determining the location of the object in the designated interaction area in relation to the first light emitter and the second light emitter based on the first and second signals, wherein the touch pad device further includes a further group of optical sensor components including a third light emitter, a fourth light emitter and a further light receiver in the touch pad device at different locations thereof separating said first and second light emitters and the light receiver such that the further receiver is capable of receiving a third amount of light emitted by the third light emitter and a fourth amount of light emitted by the fourth light emitter; wherein when the object is present at the touch pad device, causing a change in the third amount of light and the fourth amount of light said method further comprising the steps of:

measuring separately the change in the third amount of light and the change in the fourth amount of light for providing a third signal and a fourth signal indicative of the respective changes; and determining the location of the object in the designated interaction area in relation to the third light emitter and the fourth light emitter based on the third and fourth signals, wherein the first, second, third and fourth light emitters are operated in a pulsed mode of a predetermined frequency so that the changes in the first amount, the second amount, the third amount and the fourth amount of light contain a frequency component of the predetermined frequency, and wherein the pulsed mode of the first, the second, the third and the fourth light emitters has a first phase, and wherein said group of optical sensor components further includes a first compensation light emitter positioned adjacent to the light receiver to provide a first compensation amount of light to the light receiver, and said further group of optical sensor components further includes a second compensation light emitter positioned adjacent to the further light receiver to provide a second compensation amount of light to the further light receiver, and the first and second compensation light emitters are operated in a further pulsed mode of the predetermined frequency having a second phase complementary of the first phase and the first and the second compensation light emitters are controlled such that the first compensation amount of light is substantially equal to a sum of the first amount and the second amount, and the second compensation amount of light is substantially equal to a sum of the third amount and the fourth amount when the object is not present at the touch pad device.

25. A touch pad device to be used in conjunction with a measurement device, the touch pad device having a designated interaction area for sensing and detecting the presence of an object at the designated interaction area, said touch pad device comprising:

a light receiver provided in or near the designated interaction area, and a first light emitter and a second light emitter provided respectively at a first location and a second different location in the designated interaction area such that the light receiver is capable of receiving a first amount of light emitted by the first light emitter and a second amount of light emitted by the second light emitter, wherein when the object is present at the touch pad device, causes a change in the first amount of light and the second amount of light, the change in the first amount of light and the change in the second amount of light being separately measured for determining the location of the object in the designated interaction area in relation to the first light emitter and the second light emitter, and wherein the designated interaction area has an upper right corner, an upper left corner, a lower right corner and a lower left corner, and the first light emitter is provided at the upper right corner;

the second light emitter is provided at the upper left corner; and the light receiver are positioned between the first and second light emitters, said touch pad device further comprising:

a third light emitter provided at the lower right corner;

a fourth light emitter provided at the lower left corner;

a second light receiver positioned between the third and fourth light emitters, and wherein the second light receiver is capable of receiving a third amount of light emitted by the third light emitter and a fourth amount of light emitted by the fourth light emitter for further determining the location of the object in the designated interaction area in relation to the third light emitter and the fourth light emitter based separately on a change in the third amount and the fourth amount, wherein the first, second, third and fourth light emitters are bi-wavelength emitters emitting light at a first wavelength and a second wavelength, and the light receiver and the second light receiver are receivers operated at the first wavelength;

a third light receiver operated at the second wavelength and positioned between the first and third light emitters, wherein the third light receiver is capable of receiving a fifth amount of light emitted by the first light emitter in the second wavelength and a sixth amount of light emitted by the third light emitter in the second wavelength for further determining the location of the object in the designated interaction area in relation to the first light emitter and the third light emitter based separately on a change in the fifth amount and a change in the sixth amount; and a fourth light receiver operated at the second wavelength and positioned between the second and fourth light emitters, wherein the fourth light receiver is capable of receiving a seventh amount of light emitted by the second light emitter in the second wavelength and an eighth amount of light emitted by the fourth light emitter in the second wavelength for further determining the location of the object in the designated interaction area in relation to the second light emitter and the fourth emitter based separately on a change in the seventh amount and a change in the eighth amount.

* * * * *

UNITED STATES PATENT AND TRADEMARK OFFICE
CERTIFICATE OF CORRECTION

PATENT NO. : 6,927,384 B2
DATED : August 9, 2005
INVENTOR(S) : Reime et al.

It is certified that error appears in the above-identified patent and that said Letters Patent is hereby corrected as shown below:

Title page,
Item [54], Title, "METHOD AND DEVICE FOR DETECTING TOUCH PAD UNIT" should be -- METHOD AND DEVICE FOR DETECTING TOUCH PAD INPUT --.

Signed and Sealed this

Twenty-second Day of November, 2005

JON W. DUDAS
*Director of the United States Patent and Trademark Office*